United States Patent [19]

Masseth et al.

[11] Patent Number: 5,662,514
[45] Date of Patent: Sep. 2, 1997

[54] METHOD FOR PRODUCING CUTTING BLADES

[75] Inventors: John Edward Masseth, Fort Wayne; Joseph Henry Bradfield, Columbia City, both of Ind.

[73] Assignee: Dana Corporation, Toledo, Ohio

[21] Appl. No.: 437,144

[22] Filed: May 5, 1995

[51] Int. Cl.$^6$ .................................................. B24B 3/02
[52] U.S. Cl. ................................ 451/5; 451/48; 451/8
[58] Field of Search ............................ 451/48, 5, 8, 9, 451/1, 28

[56] References Cited

U.S. PATENT DOCUMENTS

| | | | |
|---|---|---|---|
| 3,192,604 | 7/1965 | Whitmore | 29/105 |
| 3,268,980 | 8/1966 | Blakesley et al. | 29/105 |
| 3,283,449 | 11/1966 | Pinkowski | 451/48 |
| 3,571,876 | 3/1971 | Blakesley | 29/105 |
| 3,659,496 | 5/1972 | Bergemann et al. | 90/8 |
| 3,701,187 | 10/1972 | Erkfritz | 29/95 |
| 3,849,862 | 11/1974 | Benjamin | 29/407 |
| 4,144,678 | 3/1979 | Ellwanger et al. | 451/48 |
| 4,265,053 | 5/1981 | Kotthaus | 51/3 |
| 4,788,856 | 12/1988 | Felger | 73/118 |
| 5,069,093 | 12/1991 | Carswell | 82/1.11 |
| 5,071,056 | 12/1991 | Sheets et al. | 228/170 |
| 5,114,287 | 5/1992 | Ervay et al. | 409/13 |
| 5,116,173 | 5/1992 | Goldrich | 409/13 |
| 5,135,810 | 8/1992 | Smith et al. | 428/579 |
| 5,168,661 | 12/1992 | Pedersen et al. | 51/285 |

*Primary Examiner*—Robert A. Rose
*Attorney, Agent, or Firm*—Oldham & Oldham Co., LPA

[57] ABSTRACT

A method for producing a cutting blade comprising the steps of obtaining a cutter head having a plurality of blade-receiving slots formed in a face thereof, positioning the cutter head in coordinate measuring machine, and inspecting a selected one of the slots using the coordinate measuring machine. Data obtained during the inspecting step is recorded on a recording medium transmitted to a computer of a numerical control grinding machine. A cutting blade blank is positioned in and ground by the computer numerical control grinding machine. The grinding step comprises the steps of generating selected finished surfaces of the cutting blade from the cutting blade blank and compensating for dimensional variations of the inspection data of the selected slot relative to dimensional design requirements of the selected slot. A plurality of the blades produced in this manner may be assembled in a cutter head so as to produce a trued face hobbing cutter head which in turn may be utilized in conjunction with a gear cutting machine to make a spiral bevel, zerol, or hypoid gear.

14 Claims, 7 Drawing Sheets

METHOD FOR PRODUCING CUTTING BLADES

BACKGROUND OF THE INVENTION

1.0 Field of the Invention

The present invention relates generally to a method for producing cutting blades and, more particularly, to a method for producing cutting blades which may be used to face hob spiral bevel, zerol, and hypoid gears.

2.0 Related Art

Spiral bevel, zerol and hypoid gears are well known and widely used throughout the automotive industry in a variety of drivetrain applications. Conventional methods for making each of these gears include face milling and face hobbing, with the two methods producing different gear tooth geometry which must be taken into consideration during the gear design. Gears produced by face milling typically have a tapered tooth depth, with the heel end of the tooth being deeper than the toe end of the tooth but they may also have uniform depth teeth. In contrast, gears produced by face hobbing always exhibit a uniform tooth depth. Face milling is an intermittent indexing process which cuts one tooth at a time and then indexes to the next slot so as to cut the adjacent tooth. This process is repeated until all of the teeth have been cut. Face milling is referred to as a two axis system since the work, or gear, is required to rotate in a timed relationship with a cradle mechanism used to mount a cutter head assembly. In contrast, face hobbing is a continuous indexing process whereby all of the gear teeth are cut simultaneously. Face hobbing is considered a three axis process since the rotation of the gear, cradle, and cutter head assembly are all in a timed relationship with one another. Face milling is an older process, with face hobbing becoming more important with the advent of computer numerical controlled machines which allows the user to produce either geometry. Customer requirements, engineering and production requirements are considered when selecting either face milling or face hobbing to produce a gear.

Each of the cutting methods utilizes a plurality of cutting blades which are mounted into slots, being typically four-sided and formed in a face of a cutter head. The cutter head is typically a two-piece construction comprising a first, disk-like member and a second, backing ring member which is concentric with the disk. In a known device, portions of each of the blade-receiving slots are formed in both the disk and the backing ring. The two members are sized such that they mate together in an interference fit and known cooling and heating techniques are utilized to assemble the parts. For instance, the disk may be cooled, so as to shrink or reduce its outer diameter, and the concentric backing ring member may be heated so as to increase its inner diameter. After assembly, the two parts may be welded or bored together. This method of assembling the concentric members of the cutter head is known to cause thermal distortion in the slots which receive the individual cutting blades. The slots typically include a radially inward blade seating surface, parallel sidewalls, and a radially outward surface. Known two-axis face milling, tapered depth style cutter heads are normally trued for variations in the radial location of the blade seating surface. This is typically accomplished using shim stock, known as parallels, or by using a system of adjusting wedges, which correct for discrepancies in radial location of the seating surface as small as 1/10,000th of an inch due to the very high accuracy that is required in manufacturing the aforementioned gears. Either the parallels or the adjusting wedges are positioned between the blade seating surface in the cutter head slots and the individual cutting blades so as to provide a method to correct radial position of the blades. Known face mill cutter heads may also be trued for pressure angle variations in the cutter blades using correction wedges to adjust the blade pressure angle.

Currently known faced hobbed parallel depth, 3-axis cutter head systems have no provisions for truing or compensating for any cutter head inaccuracies, such as positional variations in the blade seating surfaces within the slots. Instead, with known face hobbing cutter head systems, effort is focused on the quality control concerning the accuracy and repeatability of each individual cutting blade, with the underlying assumptions that all cutter head slots which will receive the individual blades of a particular group of blades, such as inside or outside cutting blades, are in identical radial positions on the cutter head and that the opposing sidewalls of each of the slots are parallel to one another. Existing blade grinding machines typically grind several blades at the same time, in specialized blade holding fixtures. Subsequently, the ground blades are typically sorted into lots based on resultant blade inspection data. These individual lots of blades are then mounted in cutter heads with no additional inspection since conventional face hobbing cutter heads do not provide a means for compensating for variations in desired locations of the blade receiving slots. Accordingly, the resulting inaccuracies due to variation in the positions of the blade receiving slots may cause tooth surface defects in the zerol, spiral bevel or hypoid gears which are manufactured using such face hobbing cutter head systems. Such defects may adversely affect the quality and service life of the gears being produced.

Another problem which occurs in some cutting blades, notwithstanding quality control efforts to the contrary, relates to variation in the rake face surface from blade to blade. Unlike other cutter blade surfaces, such as the cutting relief surface, shoulder relief surface, top relief surface, etc., the rake face surface is typically not ground on some blades once received from the original blade manufacturer due to wear coatings, such as titanium nitrite, which are typically applied to the rake face surface for increasing blade life. Consequently, variations in the rake face surface may require regrinding of various surfaces such as the cutting relief surface, following inspections, which results in additional cost. Any undetected variations in the rake surfaces could adversely affect the finished surfaces of the resultant gears. In view of the deficiencies with known face hobbing cutter head systems used to create spiral bevel, zerol and hypoid gears, applicant's invention is herein presented.

SUMMARY

Accordingly, the present invention is directed to a method for producing a cutting blade, wherein a plurality of cutting blades made according to the method of the present invention may be mounted in a cutter head assembly and advantageously used to produce gears such as spiral bevel gears, zerol gears and hypoid gears of enhanced quality due to compensation for radial and angular variations in the blade seating surfaces of the cutter head slots during the grinding of the cutting blade used to produce the gears.

According to a preferred embodiment of the present invention, a method is provided for producing a cutting blade comprising the steps of obtaining a cutter head having a plurality of blade-receiving slots formed in a face thereof; positioning the cutter head in a coordinate measuring machine; inspecting a selected one of the slots using the coordinate measuring machine; and recording inspection data obtained during the inspecting step and an identifying indicium of the cutter head on a recording medium.

The method further comprises the steps of: transmitting the inspection data and the identifying indicium of the cutter head from the recording medium to a computer numerical controlled grinding machine; positioning a cutting blade blank in a blade grinding apparatus which includes the computer numerical control grinding machine; and grinding the cutting blade blank. The grinding step comprises the steps of: generating selected finished surfaces of the cutting blade; and compensating for a dimensional variation of the inspection data of the selected one of the slots relative to design requirements of the selected slot.

BRIEF DESCRIPTION OF THE DRAWINGS

The aforementioned advantage, as well as the method steps, structural features and functions, and other advantages of the present invention, will become more apparent from the subsequent detailed description of the preferred embodiments when taken in conjunction with the accompanying drawings, wherein.

DETAILED DESCRIPTION

Figure 1:
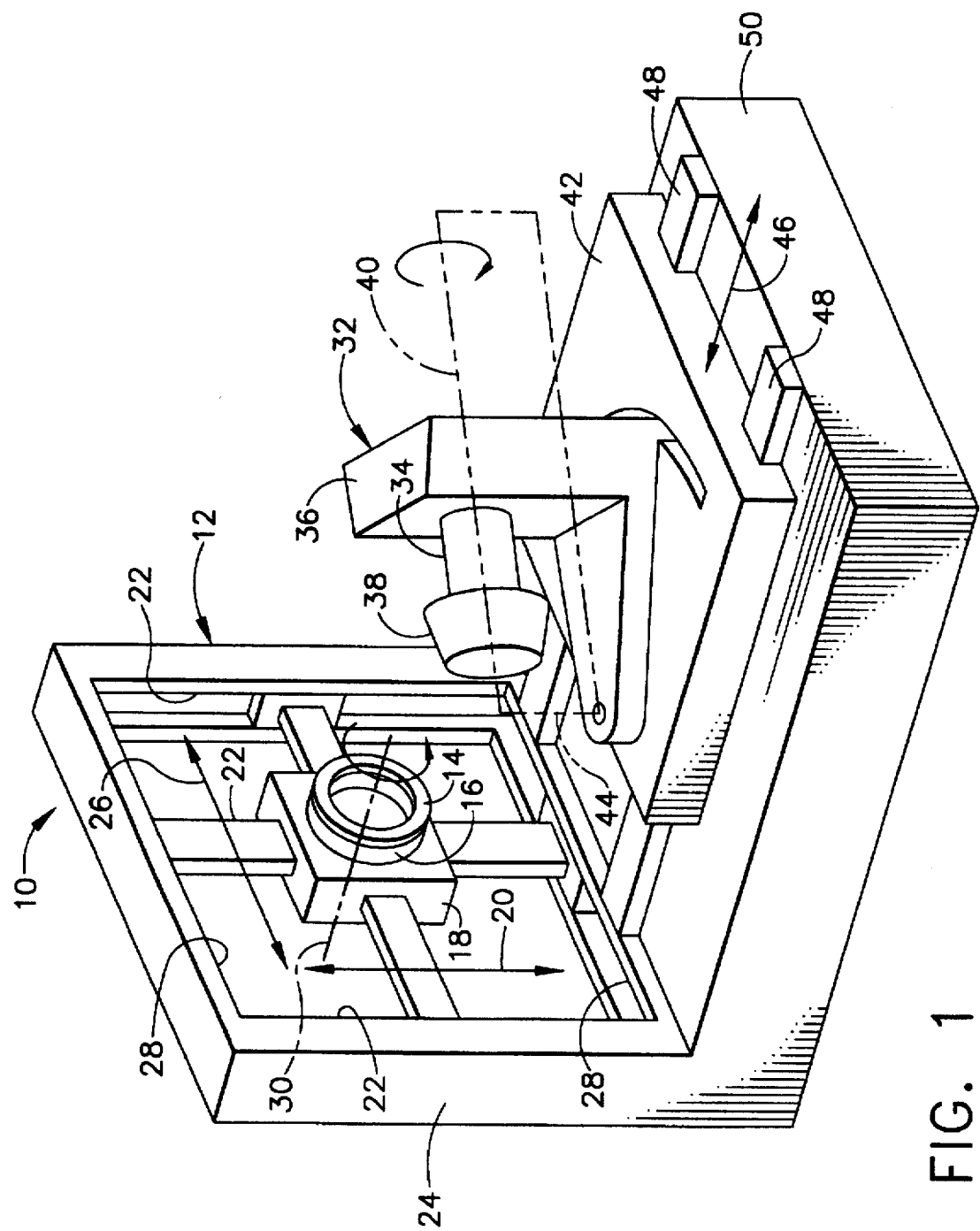
FIG. 1 is a perspective view in schematic form illustrating a computer numerical controlled gear cutting machine which may be used in conjunction with the present invention.

Referring now to the drawings, FIG. 1 is a perspective view schematically illustrating a computer numerical control (CNC) gear cutting machine 10 which is illustrative of an apparatus which may be used to face hob a gear according to the inventive process of the present invention. Machine 10 comprises a tool support 12 for a cutter head assembly 14 which is rotatably mounted within a tool spindle 16, which in turn is journaled for rotation in tool head 18. Tool head 18 is capable of vertical movement, as indicated generally by arrow 20, along guide members 22 of carriage 24. Tool head 18 is also capable of horizontal movement, as indicated generally by arrow 26, along guide members 28. Cutter head 14 and tool spindle 16 are each capable of rotation about axis 30. Head 14 is preferably keyed to spindle 16.

Machine 10 also comprises a work support 32 which includes work spindle 34 rotatably mounted in work head 36. A gear blank 38 is releasably mounted to spindle 34 with gear 38 and spindle 34 capable of rotation about axis 40. As is well known, the term "gear" is sometimes used to refer to a mechanism, or conjugate pair of members, comprising a ring or face gear and a pinion gear which meshingly engages the ring gear, with the pinion gear having the smaller number of teeth. However, the term "gear" as used herein is intended to refer to either a ring gear or a pinion gear, which is consistent with an alternative accepted usage of the term "gear". Work head 36 is mounted on a table 42 so as to permit pivotal movement about vertical axis 44. Table 42 is capable of horizontal movement, as indicated generally by arrow 46 along guide members 48 which are attached to machine base 50. Guide members 48, as well as guide members 22 and 28 which are disposed in carriage 24, permit relative linear movement of cutter head assembly 14 and gear blank 38 in three mutually orthogonal directions represented by arrows 20, 26 and 46.

Movement of tool spindle 16, work spindle 34, work head 36, table 42, and tool head 18 is imparted by separate drive motors (not shown) of CNC machine 10. The above-named components are capable of independent movement with respect to one another and may move simultaneously with one another. Each of the respective motors may be associated with either a linear or a rotary encoder which govern the operation of the drive motors in accordance with instructions input to a computer (not shown) of machine 10. The encoders provide feedback information to the computer concerning the actual positions of each of the moveable axes.

Figure 2:
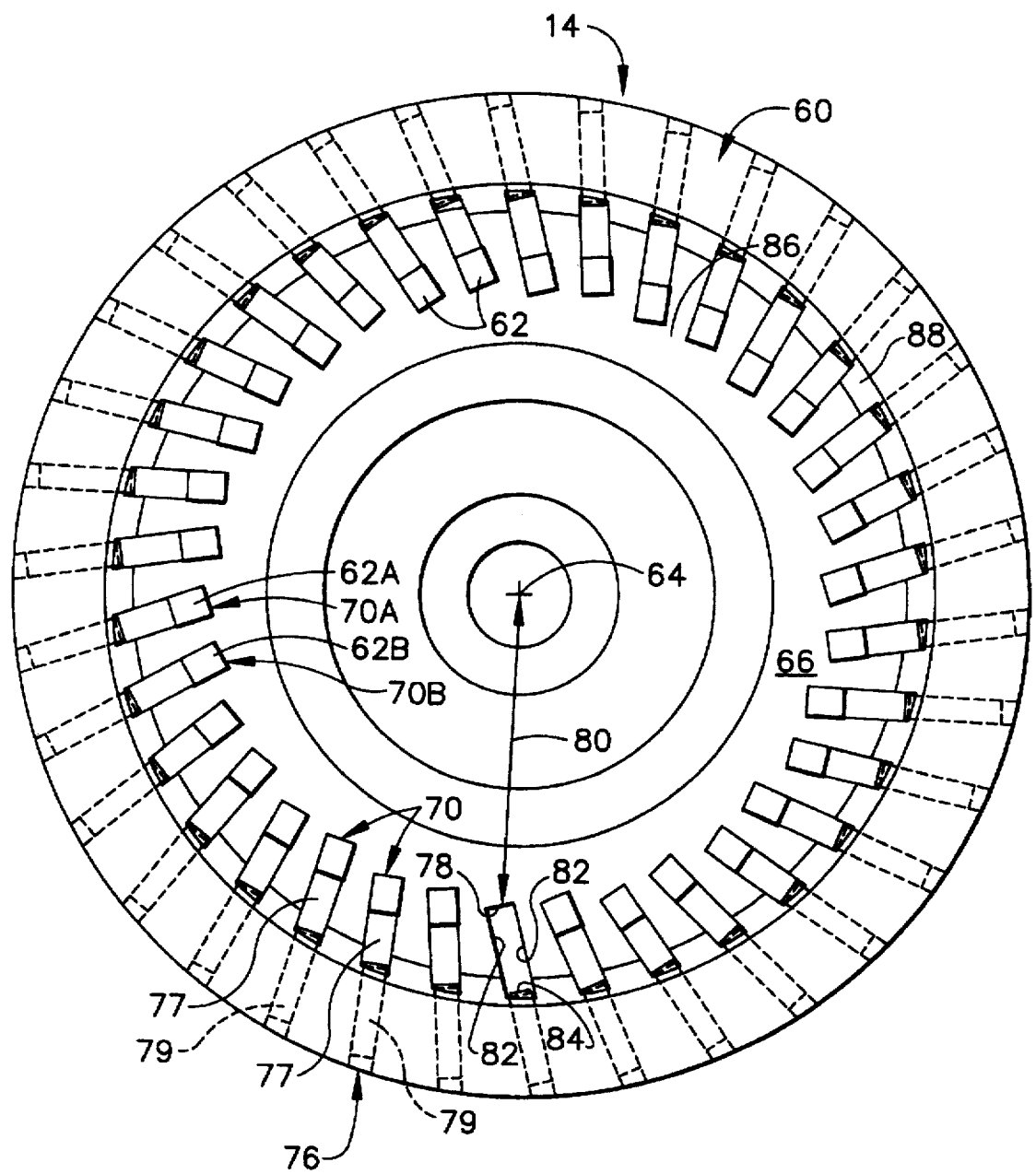
FIG. 2 is a top plan view illustrating a face hobbed cutter head assembly.

Referring now to FIG. 2, the specific construction of cutter head assembly 14 is discussed in greater detail. Cutter head assembly 14 comprises an annular cutter head 60 and a plurality of circumferentially spaced cutting blades 62 mounted on cutter head 60. Cutter head 60 includes a centerline axis 64 and a pair of opposing, spaced apart and generally circular faces with the top face shown at 66 in FIG. 2. Cutter head 60 further includes a plurality of circumferentially spaced slots 70 formed in top face 66. Each of blades 62 include a shank portion 72 (shown in FIG. 3) which is disposed in one of slob 70 and a cutting portion 74 which protrudes from face 66 of cutter head 60. Cutter head assembly 14 further includes a means for retaining shank portions 72 of blades 62 within slots 70, as indicated generally at 76. Retaining means 76 includes a plurality of clamp blocks 77, with one disposed in each slot 70, and a plurality of clamp screws 79 which are used to urge one of the blocks 77 against the shank portion 72 of a corresponding blade 62, so as to maintain blade 62 at a desired height or axial position relative to face 66. One of the slots 70 as illustrated in FIG. 2 without the corresponding blade 62 for purposes of further illustrating the structural features of slots 70. However, it should be understood that cutter head assembly 14 includes a cutting blade 62 disposed in each of the slots 70. Each slot 70 comprises a blade seating surface 78 which is displaced from centerline axis 64 by a radial distance 80 which varies from one end of surface 80 to the opposite end. Each slot 70 further comprises a pair of opposing sidewalls 82, and an endwall 84 which is disposed opposite blade seating surface 78. Blade seating surface 78 is in contacting engagement with the shank portion 72 of blade 62, so as to provide the desired radial location of blade 62 on head 60. Head 60 may comprise a first disk-like member 86 and a backing ring 88 which is concentric with and engages member 86 in an interference fit. During assembly of cutter head 60, member 86 may be cooled, typically with dry ice, and backing ring 88 may be heated so as to facilitate the assembly of backing ring 88 to member 86 in the interference fit. This assembly process may cause distortion in slots 70, which may be formed partially in disk member 86 and partially in backing ring 88. In particular, the assembly process of cutter head 60 may cause the radial position 80 of blade seating surface 78 to be larger than or smaller than the design required distance of surface 78 from centerline axis 64. Unlike cutter head assemblies which are ultimately used to face mill gear blanks, assembly 14 does not include shims, also referred to as parallels, or wedges to compensate for a mislocation of blade seating surface 78 so as to provide the desired radial location of blade 62. However, when blades 62 are ground according to the subsequently described inventive method of the present invention, assembly 14 becomes a trued cutter head assembly, with the cutting surfaces of each blade 62 positioned in the desired radial location. Additionally, the aforementioned process of assembling cutter head 60 may cause one or both of the opposing sidewalls 82 to be distorted so as to deviate from the intended angular orientation. Ideally, each of the sidewalls 82 are parallel to the centerline axis 64 of the cutter head 60 and accordingly, are parallel to one another. When either or both of the sidewalls 82 become distorted, the opposing sidewalls 82 are no longer parallel to one another which adversely effects the angular orientation of the corresponding blade 62, and the included blade cutting surfaces. This problem is obviated by the inventive method of the present invention which inspects and corrects for any deviations in the angular orientations of the sidewalls 82 relative to the centerline axis 64 or relative to each other or sidewalls 82 in adjacent slots 70. When cutter head assembly 14 is installed on a CNC machine, such as machine 10, axis 64 of assembly 14 is coincident with tool spindle axis 30.

Figure 3:
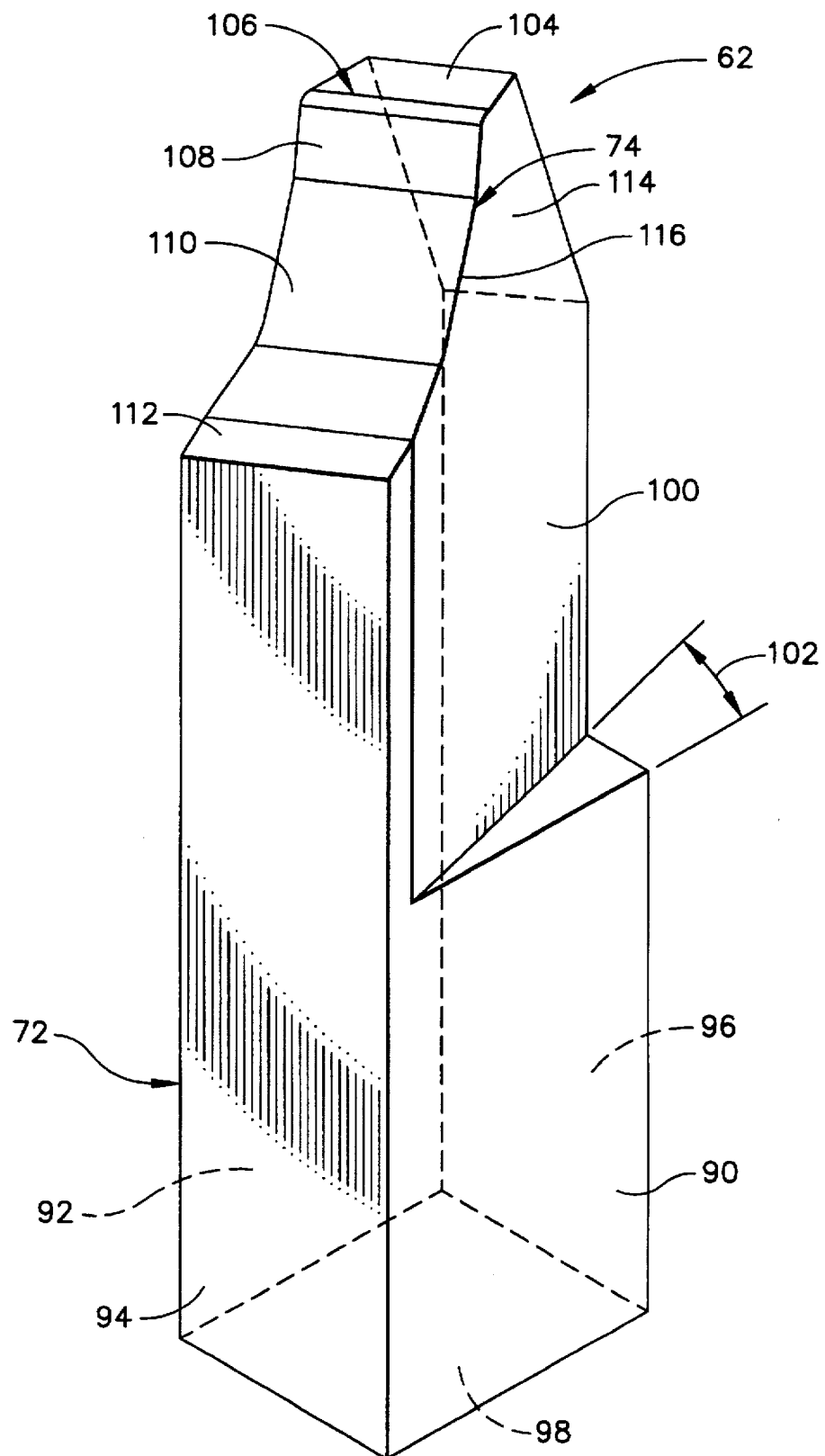
FIG. 3 is a perspective view illustrating a face hobbing cutting blade, which is installed in the cutter head of FIG. 2, according to the method of the present invention.

Referring now to FIG. 3, the specific construction of cutting blade 62 is discussed in greater detail. Cutting blade 62 comprises a side cutting, or tool bit type cutting blade and includes the shank and cutting portions indicated generally at 72 and 74, respectively. Shank portion 72 includes front surface 90, back surface 92, opposing shank sides 94 and 96, respectively and a bottom surface 98 which are disposed relative to one another so as to form a generally parallelpiped shape of shank portion 72. Blade 62 further includes a rake face surface 100 which is disposed at a rake face angle 102 relative to front surface 90. Blade 62 also includes a top relief surface 104, a corner relief surface 106, an optional toprem relief surface 108, a cutting relief surface 110, a shoulder relief surface 112 and a clearance relief surface 114. The toprem relief surface 108 is optional depending on the ultimate use of blade 62. As shown in FIG. 3, cutting relief surface 110 is disposed between the toprem surface 108 (when included) and shoulder relief surface 112. When toprem surface 108 is not included, the cutting relief surface 110 is disposed between the top relief surface 104 and the shoulder relief surface 112. Blade 62 further includes a cutting edge 116 which comprises an interface between cutting relief surface 110 and rake face surface 100. The cutting edges 116 of blades 62 are used to cut a desired shape into gear blank 38 when cutter head assembly 14 is installed on machine 10. Surfaces 104, 106, 108, 110, 112 and 114 may be produced by grinding a cutting blade blank using the inventive method of the present invention. In contrast, rake face surface 100, which typically includes a wear coating such as titanium nitrite for improved blade life, is not ground by the inventive method of the present invention.

Figure 4:
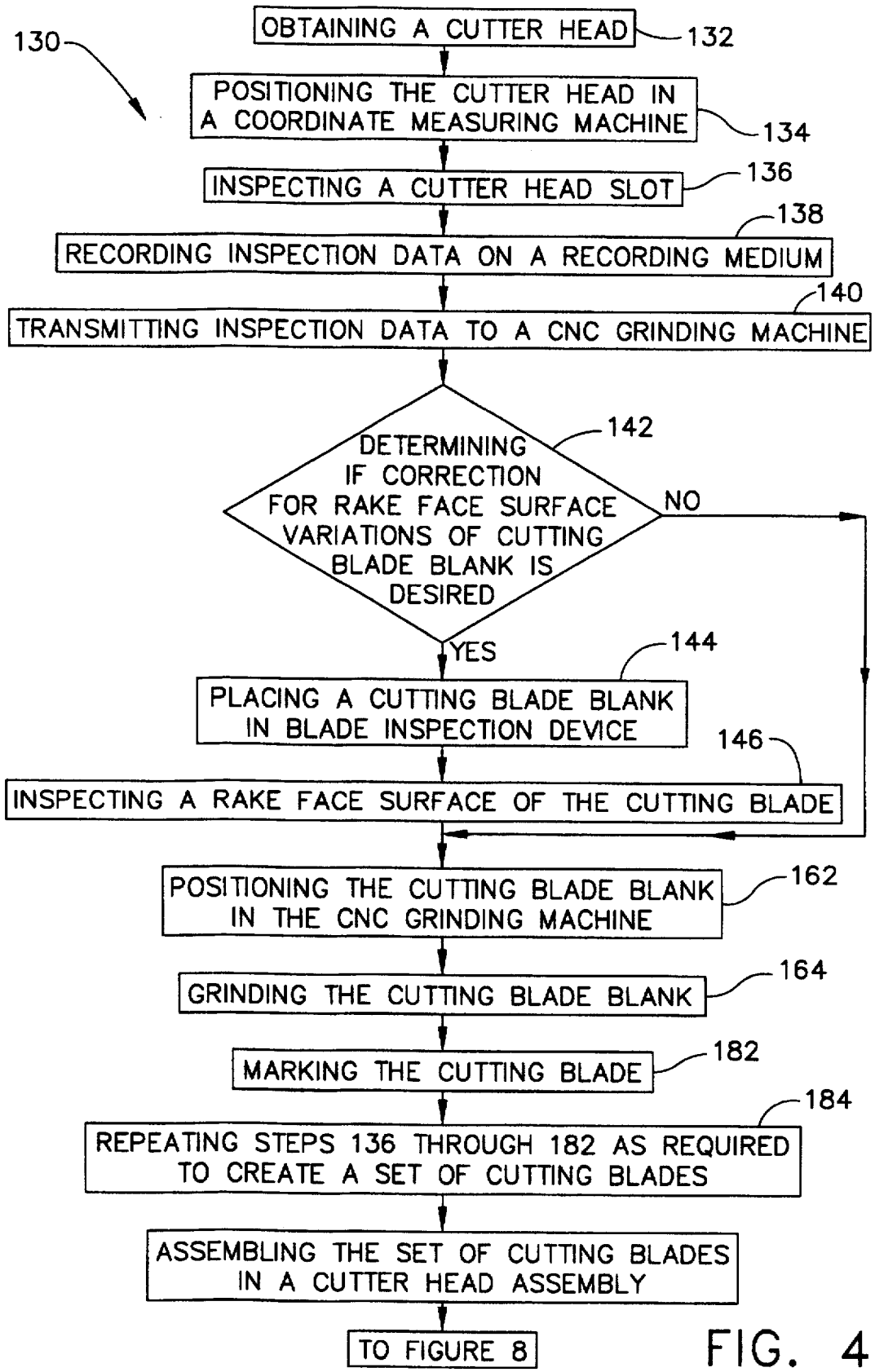
FIG. 4 is a flow diagram illustrating a method for producing a cutting blade according to the present invention.
Figure 5:
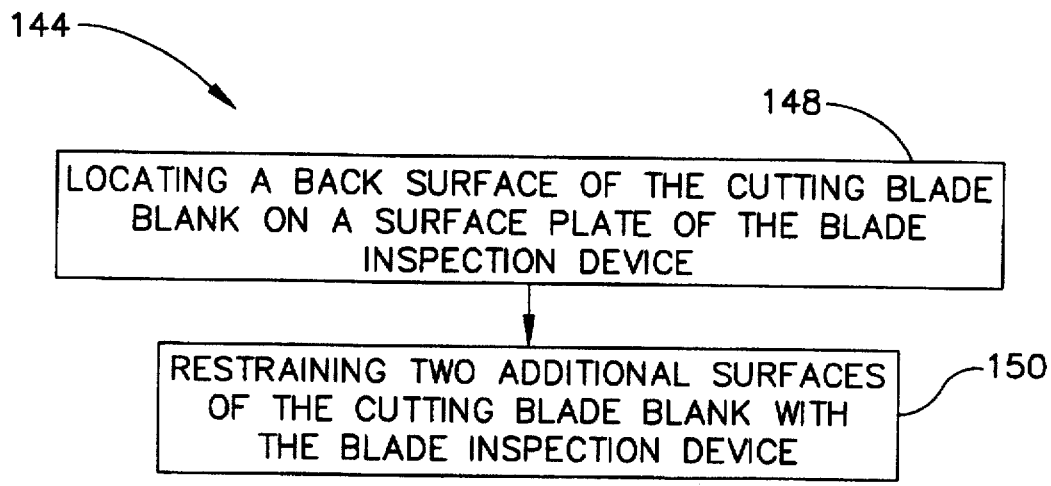
FIGS. 5 and 6 are flow diagrams further illustrating the method of FIG. 4.
Figure 6:
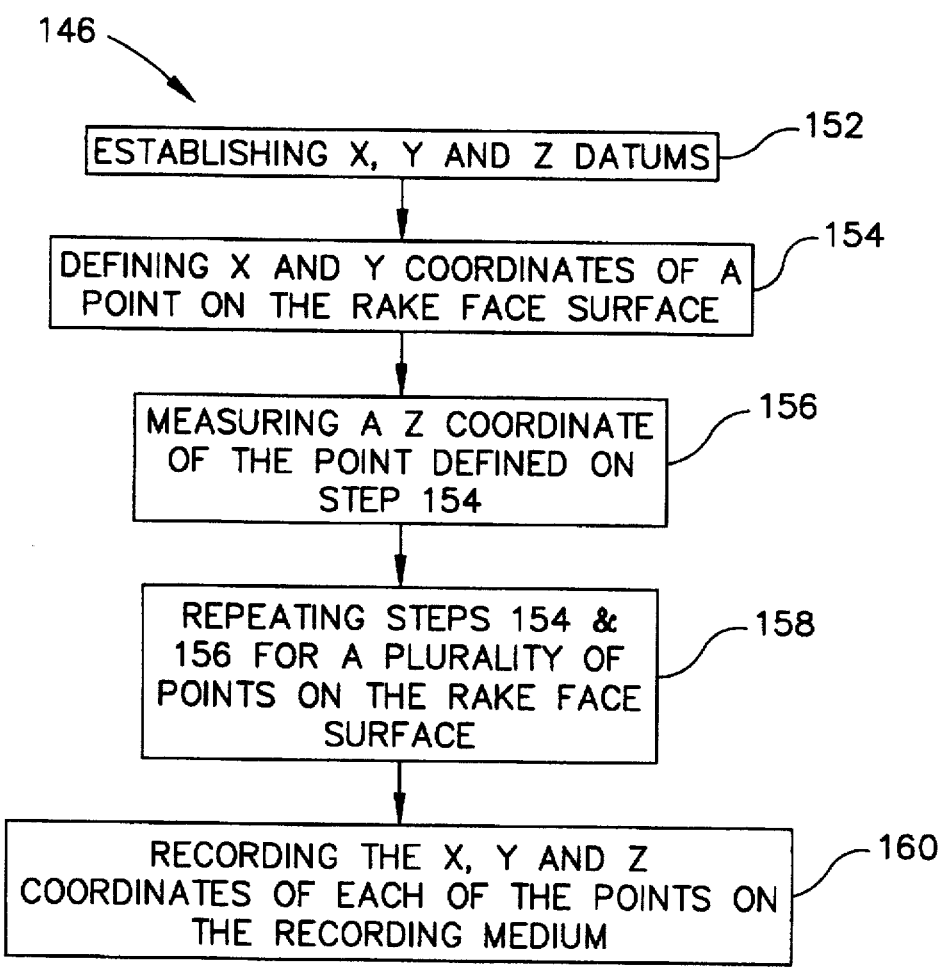

Referring now to FIGS. 4-8, the particular steps of the inventive method will be discussed. FIGS. 4-6 illustrate the steps of a method 130 which may be used to produce a single cutting blade 62 from a corresponding cutting blade blank (not shown) or a complete set of cutting blades 62 mounted in cutter head 60 to produce a trued cutter head assembly 14. Method 130 includes a first step 132 of "obtaining a cutter head", which may be performed by obtaining cutter head 60 illustrated in FIG. 2 which includes the plurality of blade-receiving slots 70. A next step 134 is "positioning the cutter head in a coordinate measuring machine", wherein the measuring machine (not shown) is capable of measuring various structural features of the cutter head 60, such as the various surfaces of slot 70. After positioning cutter head 60 in the coordinate measuring machine, a step 136, "inspecting a cutter head slot" is completed which comprises the step of measuring radial distance 80 from centerline axis 64 to the blade seating surface 78 of a selected one of the slots 70. Step 136 further comprises the step of measuring the angular position, or orientation, of each of the sidewalls 82 relative to the centerline axis 64 of the cutter head 60. At a next step 138, "recording inspection data on a recording medium", the radial distance 80 of the selected slot 70, as well as an identifying indicium of the cutter head 60 and an identifying indicium of the selected slot 70, are recorded on a recording medium which is suitable for input to the computer of a conventional CNC blade grinding machine (not shown). Accordingly, the recording medium may comprise a magnetic tape or disk. The identifying indicium of the cutter head 60 may comprise a serial number or other distinguishing identifications of the particular cutter head 60. Similarly, the identifying indicium of the selected slot 70 may comprise a serial number or other suitable distinguishing identification. At a next step 140, "transmitting inspection data to a computer numerical control grinding machine" the radial distance 80 of the selected slot 70 and the identifying indicia of cutter head 60 and the selected slot 70 are transmitted from the recording medium to the computer of the CNC grinding machine. Steps 138 and 140 also include the recording and transmission, respectively, of the angular position, or orientation, of the sidewalls 82.

Next, step 142 poses the question "determining if correction for rake face surface variations of cutting blade blank is desired?". If the answer to the question of step 142 is "yes", optional steps 144 and 146 are completed, which permit subsequent steps to compensate for variations of a rake face surface of the cutting blade blank when grinding various finished surfaces of cutting blade 62. The shank portion and the rake face surface of the cutting blade blank correspond to shank portion 72 and rake face surface 100 of the finished cutting blade 62 illustrated in FIG. 3. However, the outer portion of the cutting blade blank differs from cutting portion 74 of blade 62, since the various relief surfaces such as cutting relief surface 110, shoulder relief surface 112, etc., do not exist initially in the cutting blade blank. Instead, the outer portion of the cutting blade blank is of a generally block or parallelpiped shape. The various relief surfaces are ground, or created, from this outer block shaped portion of the cutting blade blank. Step 144 comprises "placing a cutting blade blank in a blade inspection device" and step 146 comprises "inspecting a rake face surface of the cutting blade blank" which is performed after completion of the "placing" step 144. Considerations of variations in the rake face surface of the cutting blade blank are independent of the considerations of the radial positioning variations in blade seating surface 78 of slot 70. Accordingly, if the answer to the question posed in step 142 is "no", steps 144 and 146 may be omitted. As shown in FIG. 5, "placing" step 144 comprises a first step 148 of "locating a back surface of the cutting blade blank on a surface plate of the blade inspection device". Accordingly, the blade blank surface which corresponds to surface 92 of the cutting blade 62 (shown in FIG. 3) is located on the surface plate of the inspection device. Step 144 further comprises a step 150 of "restraining two additional surfaces of the cutting blade blank with the blade inspection device". Step 150 may be performed by restraining another surface of the shank portion of the cutting blade blank, which is disposed at 90 degrees to the back surface, and the topmost or outermost surface of the blade blank.

Accordingly, the three surfaces of the blade blank which are restrained are mutually perpendicular to one another. "Locating" step 148 and "restraining" step 150 allow the cutting blade blank to be inspected according to step 146.

As shown in FIG. 6, "inspecting" step 146 comprises a first step 152 of "establishing X, Y and Z datums". Step 152 may be performed by establishing X, Y and Z datums which are either located on the three mutually perpendicular surfaces which are restrained or, alternatively, by locating one or more of the datums off of the blade blank but parallel to the adjacent restrained surface. The X, Y and Z datums are selected so that they are mutually perpendicular to one another. "Inspecting" step 146 further comprises the step 154 of "defining X and Y coordinates of a point on the rake face surface". A next step 156 comprises "measuring a Z coordinate of the point defined in step 154". Step 156 is accomplished with the blade inspection device wherein a thickness of the blade blank is measured from the back surface to the particular point on the rake face surface. A next step 158 comprises "repeating steps 154 and 156 for a plurality of points on the rake face surface". In this manner an array of X, Y and Z coordinates may be created for a plurality of points so as to define the actual location of the rake face surface. Inspecting step 146 further includes a step 160 of "recording the X, Y and Z coordinates of each of the points on the recording medium".

Figure 7:
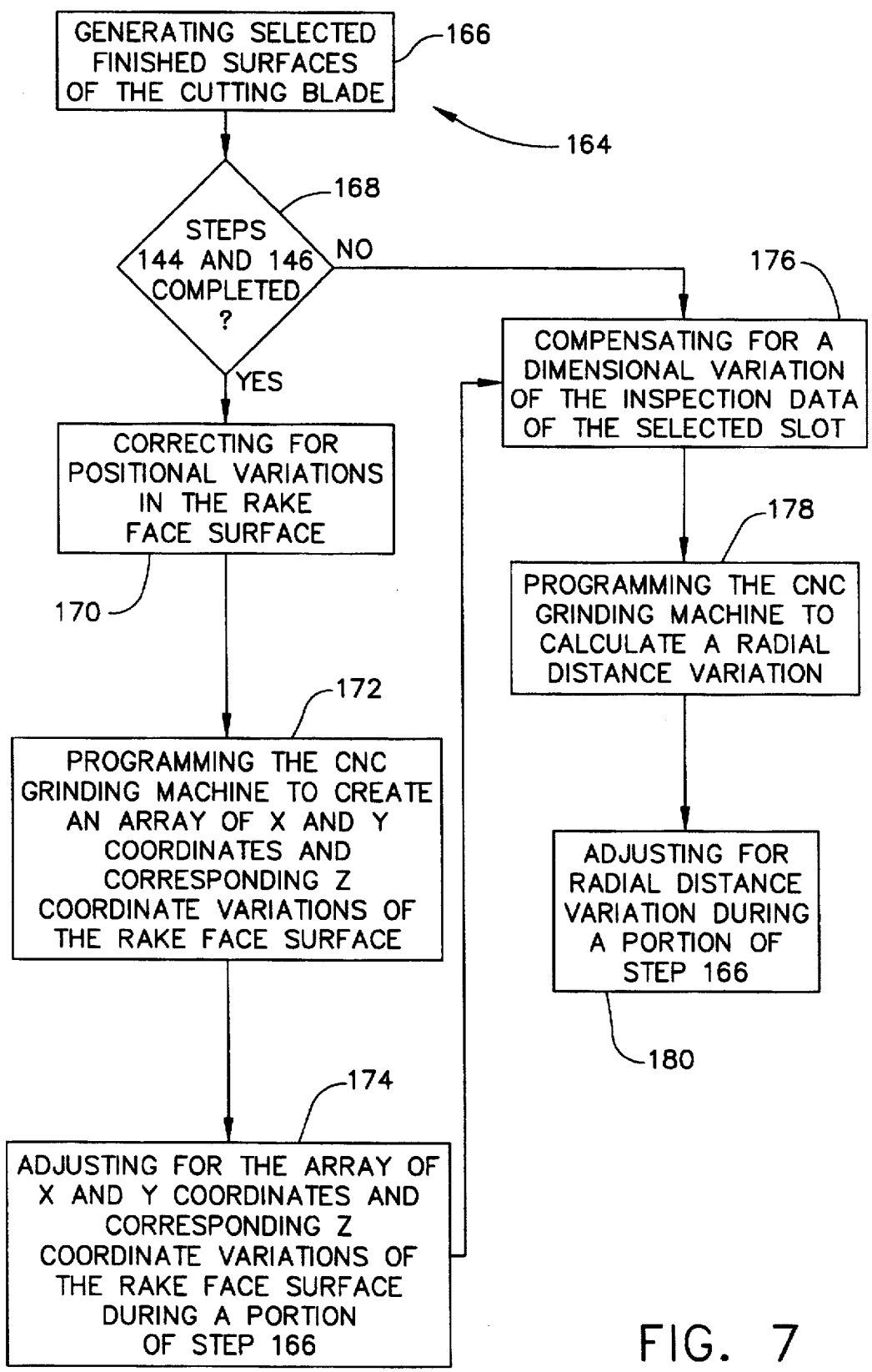
FIG. 7 is a flow diagram illustrating a method for making a gear according to the present invention.

Method 130 further includes step 162 of "positioning the cutting blade blank in the CNC grinding machine" and step 164 of "grinding the cutting blade blank". As shown in FIG. 7, "grinding" step 164 comprises a first step 166 of "generating selected finished surfaces of the cutting blade". The next step 168 comprises asking the question "steps 144 and 146 completed?". If the answer to the question posed in step 168 is "no", then there is no correction for rake face surface variations during the step 166 of "generating selected finished surfaces of the cutting blade". However, if the answer to the question posed in step 168 is "yes", step 170 comprising "correcting for positional variations in the rake face surface", is performed. Step 170 is performed by correcting for the actual measured location of the rake face surface as compared to the design required location of the rake face surface and includes a step 172 of "programming the CNC grinding machine to create an array of X and Y coordinates and corresponding Z coordinate variations of the rake face surface". During step 172, the CNC grinding machine is programmed to calculate a difference between measured and design required Z coordinates corresponding to each of the points inspected on the rake face surface. In this manner, the difference between the actual and desired location of the rake face surface is determined. Step 166 includes the steps of generating the following finished surfaces from the cutting blade blank: top relief surface 104; corner relief surface 106; cutting relief surface 110; shoulder relief surface 112; and clearance relief surface 114. Step 166 may further include the step of generating the toprem relief surface 108, depending upon the ultimate use of blade 62 as discussed previously. "Correcting" step 170 also includes a step 174 of "adjusting for the array of X and Y coordinates and corresponding Z coordinate variations of the rake face surface during a portion of step 166". The "adjusting" step 174 is performed automatically by the CNC grinding machine during the portion of step 166 corresponding to the generation of cutting relief surface 110. The location of surface 110 is adjusted as required so that cutting edge 116 is in the desired location notwithstanding any variations in the design required location of the rake face surface of the cutting bade blank. This is particularly important, since the intersection of rake face surface 100 and cutting relief surface 110 forms cutting edge 116. Without steps 170 through 174, an undesired variation in the location of rake face surface 100 may require a regrinding of the cutting relief surface 110, to produce the proper location of cutting edge 116 which is ultimately used to cut a desired shape in a gear blank.

Regardless of the answer to the question posed in step 168, the "grinding" step 164 further includes a step 176 of "compensating for a dimensional variation of the inspection data of the selected slot". The "compensating" step 176 includes a first step 178 of "programming the CNC grinding machine to calculate a radial distance variation". Step 178 is performed by calculating a radial distance variation between a measured and a design required radial distance 80, from centerline axis 64 to blade seating surface 78, of the selected slot 70. The "compensating" step 176 further includes a next step 180 of "adjusting for the radial distance variation during a portion of step 166". As with step 174, "adjusting" step 180 is performed during the portion of step 166 which corresponds to the step of generating the cutting relief surface 110. Accordingly, regardless of the actual position of the blade seating surface 78 of the selected one of the slots 70, the location of cutting relief surface 110 will be adjusted so that cutting edge 116 is properly located. Step 180 is performed automatically by the computer of the CNC grinding machine. Step 178 may further include the step of programming the CNC grinding machine to calculate an angular position variation of the sidewalls 82 relative to the centerline axis. Similarly, step 180 may further include the step of adjusting for the angular position variation of the sidewalls 82 and this may be done simultaneously with the step of adjusting for the radial distance variation.

Returning now to FIG. 4, method 130 further includes a step 182 of "marking the cutting blade". Step 182 comprises marking the cutting blade 62 with an identifying indicium of the cutter head 60 and the selected slot 70 of head 60, with which blade 62 has been matched, due to the adjustment of the grinding of cutting relief surface 110 of blade 62 to accommodate the radial location of the blade seating surface 78 of the particular slot 70. The marking step is performed so that the cutting blade 62 may be subsequently assembled into the matching slot 70 of the cutter head assembly 14. The marking may be accomplished by any non-destructive conventional means such as etching, vibropeening or "bagging and tagging" the blade 62. After completing the step 182, the method of the present invention has been completed with respect to the production of one of the cutting blades 62. The method 130 may further include a step 184 "repeating steps 136 through 182 as required to create a set of curing blades". This step is completed by performing steps 136 through 182 to produce a number of curing blades 62 corresponding to the number of slots 70 in cutter head 60, with each of the blades 62 corresponding to a particular one of the slots 70. For instance, as shown in FIG. 2, blade 62A is installed in slot 70A, blade 62B is installed in slot 70B, and so on, wherein blades 62A and 62B have been ground to compensate for any variations in the blade seating surface 78 of slots 70A and 70B respectively. After completion of step 184, the step 186 comprising "assembling the set of curing blades in a cutter head" may be performed to produce a trued cutter head assembly which compensates for any variation in radial position of the blade seating surfaces 78 of the slots 70. In this manner, the cutter head assembly overcomes the deficiency of prior face hobbing cutter head assemblies which have no provisions for radially truing the cutting blades. If steps 170 through 174 have been completed the cutter head assembly created by step 186 is not only a trued cutter head assembly, but is also a rake-face-surface-compensated cutter head assembly.

Figure 8:
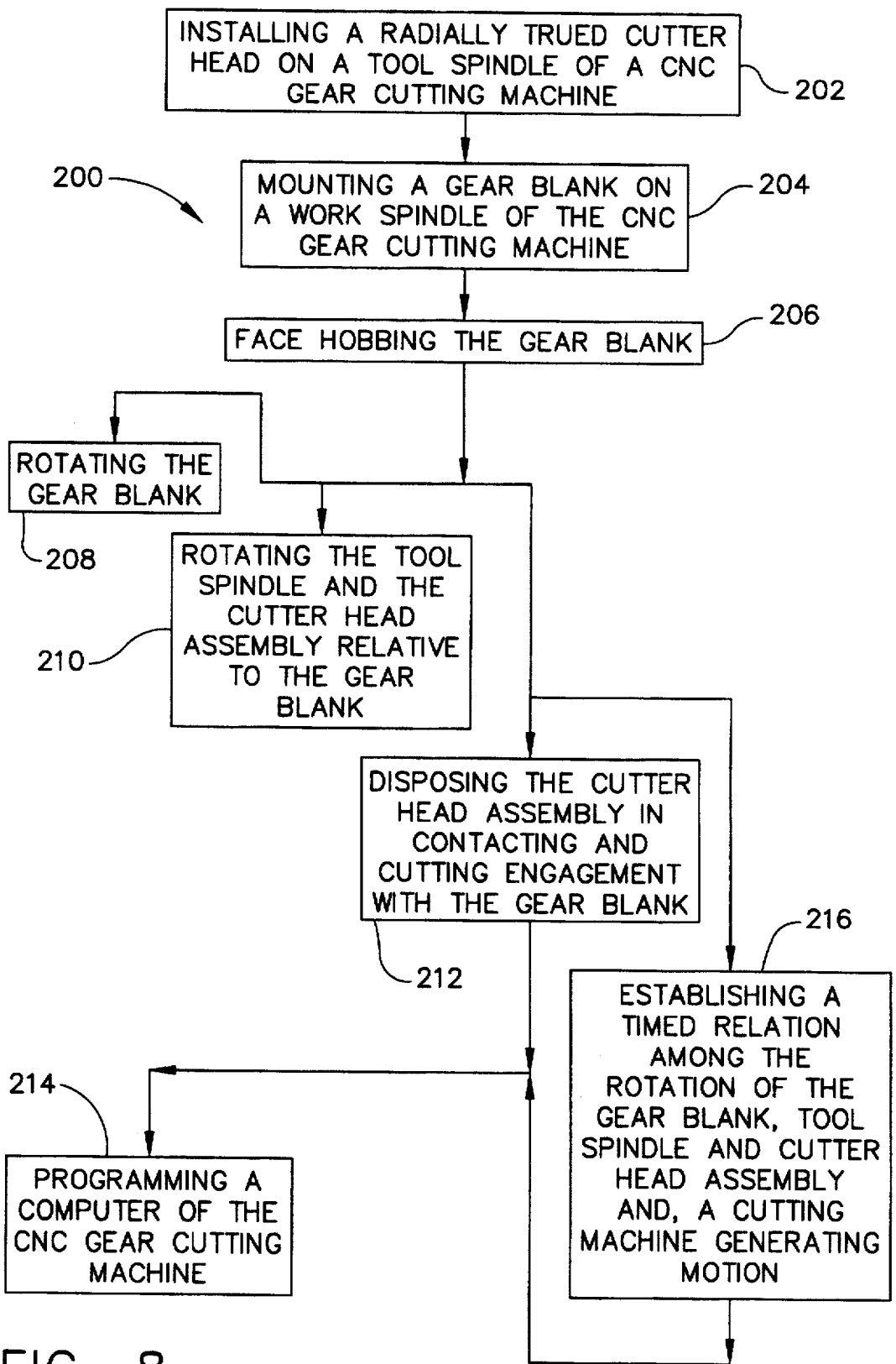
FIG. 8 is a flow diagram further illustrating the method of FIG. 7.

Referring now to FIG. 8, a method 200 for making a gear is illustrated in flow diagram form. A first step 202 comprises "installing a trued cutter head assembly on a tool spindle of a CNC gear cutting machine" of a CNC gear cutting system. The trued cutter head assembly of step 202 corresponds to an assembly 14 which has been assembled by the method 130 discussed previously. The tool spindle of step 202 may correspond to the tool spindle 16 of machine 10 illustrated in FIG. 1, wherein spindle 16 is journaled for rotation in tool head 18 of the gear cutting machine 10. The cutter head assembly 14, is rotatably mounted within tool spindle 16. Method 200 further comprises a step 204 of "mounting a gear blank on a work spindle of a CNC gear cutting machine". Step 204 may be performed by mounting gear blank 38 on spindle 34 of machine 10, wherein spindle 34 is journaled for rotation within work head 36. Next, the step 206 of "face hobbing the gear blank", may be performed. The "face hobbing" step 206 comprises steps 208 through 216 which are performed as follows. Step 208 comprises "rotating the gear blank" wherein gear blank 38 is rotated about axis 40 of work spindle 34. Step 210 comprises "rotating the tool spindle and cutter head assembly relative to the gear blank", wherein tool spindle 16 and cutter head assembly 14 are rotated about axis 30. The step 212 comprises "disposing the cutter head assembly in contacting and cutting engagement with the gear blank". Step 212 is accomplished by the separate drive motors and the computer of CNC gear cutting machine 10 discussed previously. The disposing step 212 comprises the step 214 of "programming a computer of the CNC gear cutting machine", wherein the computer is programmed to control a pivoting motion of work head 32 about axis 44 and relative linear movement of cutter head assembly 14 and gear blank 38 in the three mutually orthogonal directions as indicated by arrows 20, 26 and 46. The step 216 comprises "establishing a timed relation among the rotation of the gear blank, tool spindle and cutter head assembly, and a cutting machine generating motion", which is unique to the three-axis face hobbing method of cutting gears. The cutting machine generating motion referred to in step 216 comprises the motion created by the pivoting of work head 32 about axis 44 and the relative linear movement of cutter head assembly 14 and gear blank 38 in the three mutually orthogonal directions indicated by arrows 20, 26 and 46. As with step 212, step 216 comprises the step of "programming a computer of the CNC gear cutting machine".

The gear produced by method 200 may comprise a spiral bevel gear, a zerol gear or a hypoid gear. Regardless of the type of gear produced by method 200, the gear exhibits enhanced quality relative to gears produced by a method which includes a non-trued cutter head assembly. Specifically, gears produced by method 200 are substantially devoid of the flat spots which typically exist along the tooth profile for gears produced by prior face hobbing methods. The flat spots of prior gear teeth produce increased gear noise which is undesirable.

While the foregoing description has set forth the preferred embodiments of the invention in particular detail, it must be understood that numerous modifications, substitutions and changes can be undertaken without departing from the true spirit and scope of the present invention as defined by the ensuing claims. The invention is therefore not limited to specific preferred embodiments as described, but is only limited as defined by the following claims.

What is claimed is:

1. A method for producing a cutting blade, comprising the steps of:
   (a) obtaining a cutter head having a plurality of blade-receiving slots formed in a face thereof;
   (b) positioning said cutter head in a coordinate measuring machine;
   (c) inspecting a selected one of said slots using said coordinate measuring machine;
   (d) recording inspection data obtained during said inspecting step and an identifying indicium of said cutter head on a recording medium;
   (e) transmitting said inspection data and said identifying indicium of said cutter head from said recording medium to a computer numerical control grinding machine;
   (f) positioning a cutting blade blank in said computer numerical control grinding machine; and
   (g) grinding said cutting blade blank, wherein said grinding step comprises the steps of:
      (i) generating selected finished surfaces of said cutting blade from said cutting blade blank; and
      (ii) selectively removing a calculated amount of material from at least one of a toprem relief surface, a cutting relief surface and a shoulder relief surface of said cutting blade blank to compensate for at least one dimensional variation of said inspection data of said selected one of said slots relative to dimensional design requirements of said selected one of said slots.

2. The method as recited in claim 1, wherein said inspecting step comprises the steps of:
   (a) measuring a radial distance from a centerline axis of said cutter head to a blade seating surface of said selected one of said slots;
   (b) wherein said inspection data comprises said radial distance.

3. The method as recited in claim 2, wherein:
   (a) said generating step comprises the step of generating a cutting relief surface;
   (b) said compensating step comprises the steps of
      (i) programming said computer numerical control grinding machine to calculate a radial distance variation between said radial distance and a design required radial position of said blade seating surface relative to said centerline axis;
      (ii) adjusting for said radial distance variation during said step of generating said cutting relief surface, wherein said adjusting step is performed automatically by said computer numerical control grinding machine.

4. The method as recited in claim 1, wherein said step of generating selected finished surfaces further comprises the steps of generating:
   (a) a top relief surface;
   (b) a corner relief surface;
   (c) a shoulder relief surface;
   (d) a clearance relief surface.

5. The method as recited in claim 1, further comprising, the step of marking said cutting blade with an identifying indicium of said selected one of said slots.

6. The method as recited in claim 1, further comprising the steps of:
   (a) placing said cutting blade blank in a blade inspection device;

(b) inspecting a rake face surface of said cutting blade blank after completing said placing step;

(c) wherein said step of grinding further includes the step of correcting for positional variations in said rake face surface relative to design requirements of said rake face surface.

7. The method as recited in claim 6, wherein said placing step comprising the steps of:

(a) locating a first, back surface of said cutting blade blank on a surface plate of said blade inspection device;

(b) restraining second and third surfaces of said cutting blade blank with said blade inspection device, said second and third surfaces being substantially mutually perpendicular to one another and to said back surface.

8. The method as recited in claim 7, wherein said step of inspecting said rake face surface comprises the steps of:

(a) establishing X, Y and Z datums in relationship to said first, second and third surfaces of said cutting blade blank;

(b) defining X and Y coordinates of a point on said rake face surface;

(c) measuring a Z coordinate of said point having said X and Y coordinates;

(d) repeating steps (b) and (c) the defining and measuring for a plurality of points on said rake face surface;

(e) recording said X, Y and Z coordinates of each of said points on said recording medium.

9. The method as recited in claim 8, wherein:

(a) said transmitting step includes the step of transmitting said X, Y and Z coordinates of each of said points on said rake face surface from said recording medium to said computer numerical control grinding machine;

(b) said correcting step includes the step of:

(i) programming said computer numerical control grinding machine to calculate a difference between said measured Z coordinate and a design required Z coordinate for each of said points so as to create an array of X and Y coordinates and corresponding Z coordinate variations of said points on said rake face surface.

10. The method as recited in claim 9, wherein said correcting step further includes the step of adjusting for said array of X and Y coordinates and corresponding Z coordinate variations of said points on said rake face surface during said step of generating said cutting relief surface, wherein said adjusting step is performed automatically by said computer numerical control grinding machine.

11. The method as recited in claim 2, wherein said inspecting step further comprises the steps of:

(a) measuring an angular position of at least one of said sidewalls of said selected one of said slots relative to said centerline axis;

(b) wherein said inspection data comprises said angular position of said at least one of said sidewalls.

12. The method as recited in claim 11, wherein:

(a) said generating step further comprises the step of generating a cutting relief surface;

(b) said compensating step comprises the steps of (i) programming said computer numerical control grinding machine to calculate an angular position variation between said angular position and a design required angular position of said at least one of said sidewalls relative to said centerline axis;

(ii) adjusting for said angular position variation during said step of generating said cutting relief surface, wherein said step of adjusting for said angular position is performed automatically by said computer numerical control grinding machine.

13. The method as recited in claim 12, wherein said step of adjusting for said angular position variation is completed simultaneously with said step of adjusting for said radial distance variation.

14. The method as recited in claim 4, wherein said step of generating selected finished surfaces further comprises the step of generating a toprem relief surface.

* * * * *